United States Patent
Schinabeck et al.

(10) Patent No.: US 7,605,196 B2
(45) Date of Patent: Oct. 20, 2009

(54) WATER-SOLUBLE COPOLYMERS CONTAINING SULFO GROUPS, METHOD FOR THE PRODUCTION AND USE THEREOF

(75) Inventors: Michael Schinabeck, Garching (DE); Stefan Friedrich, Garching (DE); Uwe Holland, Wehringen (DE); Thomas Pfeuffer, Trostberg (DE); Michael Eberwein, Garching an der Alz (DE); Thomas Schuhbeck, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 227 days.

(21) Appl. No.: 11/631,454

(22) PCT Filed: Jun. 30, 2005

(86) PCT No.: PCT/EP2005/007089

§ 371 (c)(1),
(2), (4) Date: Feb. 27, 2007

(87) PCT Pub. No.: WO2006/002936

PCT Pub. Date: Jan. 12, 2006

(65) Prior Publication Data

US 2008/0200590 A1  Aug. 21, 2008

(30) Foreign Application Priority Data

Jul. 3, 2004 (DE) .................. 10 2004 032 304

(51) Int. Cl.
*C04B 24/26* (2006.01)
*C08F 12/08* (2006.01)
*C08F 12/30* (2006.01)

(52) U.S. Cl. .......................... 524/5; 526/264; 526/287

(58) Field of Classification Search ............... 524/5; 526/264, 287

See application file for complete search history.

(56) References Cited

U.S. PATENT DOCUMENTS

| 5,087,646 A | 2/1992 | Tork et al. |
| 5,476,885 A | 12/1995 | Tahara et al. |
| 6,187,887 B1 | 2/2001 | Albrecht et al. |

FOREIGN PATENT DOCUMENTS

| CH | 380 375 A | 7/1964 |
| DE | 197 52 093 A1 | 7/1999 |
| DE | 198 06 482 A1 | 8/1999 |
| DE | 100 37 629 A1 | 2/2002 |
| DE | 103 16 239 A1 | 10/2003 |
| DE | 10-2004 013 158 A1 | 10/2005 |
| FR | 2 108 635 A | 5/1972 |

*Primary Examiner*—Ling-Siu Choi
*Assistant Examiner*—Hui Chin
(74) *Attorney, Agent, or Firm*—Fulbright & Jaworski L.L.P.

(57) ABSTRACT

The invention relates to water-soluble copolymers used as water retention agents, stabilizers and rheology modifiers in aqueous building material systems based on hydraulic binders such as cement, lime, plaster, anhydrite etc. and in water-based paint and coating systems. The inventive copolymers are highly effective water retention agents even when used in relatively small amounts. They also exhibit excellent air pore stability and adhesiveness. They can also be used as stabilizers in building material and paint systems.

14 Claims, No Drawings

WATER-SOLUBLE COPOLYMERS CONTAINING SULFO GROUPS, METHOD FOR THE PRODUCTION AND USE THEREOF

This is a §371 of PCT/EP2005/007089 filed Jun. 30, 2005, which claims priority from German Patent Application No. 10 2004 032 304.6 filed Jul. 3, 2004.

The present invention relates to water-soluble, sulpho group-containing copolymers, to methods for the production thereof and to the use thereof as water retention agents, stabilisers and rheology modifiers in aqueous construction material systems based on hydraulic binders such as cement, lime, gypsum, anhydrite, etc. and in water-based paint and coating systems.

The addition of additives to hydraulic or latent hydraulic binders such as, for example, cement or gypsum is known advantageously to alter the properties of the construction material. Thus, for example, the addition of an additive from the group of plasticizers facilitates workability by substantially improving flowability. However, in the case of highly flowable mixtures, the tendency toward the segregation of heavier constituents (sand and possibly gravel) and toward the separation of bleed water on the surface is markedly increased. This has detrimental effects on the workability and the solid properties of the hardened building material mix. Stabilisers (also known as anti-segregation agents, anti-bleeding agents or viscosity modifiers) are therefore used to prevent these undesirable effects. Water-soluble nonionic derivatives of polysaccharides, in particular cellulose and starch derivatives, are conventionally used in aqueous construction material mixes. However, microbially produced polysaccharides such as, for example, welan gum are also used, in accordance with the prior art, to prevent the undesired segregation and the separation of bleed water.

However, the additives based on water-soluble nonionic derivatives of polysaccharides and microbially produced polysaccharides display various significant drawbacks when used in flowable aqueous construction material systems:

As the anti-bleeding and anti-segregation properties are, in particular, achieved by a thickening (increase in viscosity) of the construction material mix, the flow properties, and therefore the workability, are adversely affected in flowable construction material applications. Also frequently observed is excessive tack which is undesirable for these flowable applications.

For specific building material applications (especially concrete), the additives have to be used in the form of aqueous solutions. However, the production of aqueous solutions of the known additives is difficult, as, for example, cellulose ethers have poor solubility and in some cases flocculate under the effect of coldness and heat. Decomposition reactions also cause the stability (in storage) to deteriorate over time to insufficient levels (bacterial infestation).

Many of the cellulose derivatives used in the building material industry display setting-retarding properties.

However, water-soluble nonionic derivatives of polysaccharides, in particular cellulose and starch derivatives are also used in aqueous construction material mixes as water retention agents to delay or prevent the undesirable evaporation of the water, which is necessary for hydration and workability, or the flowing thereof into the substrate.

Additives of this type allow the central function of water retention to be controlled in paint systems, renders, adhesive mortars, fillers and joint fillers, but also in air-placed concretes for the construction of tunnels and in underwater concretes. Additives of this type thus also have an important effect on the consistency (plasticity), open time, smoothing capacity, segregation, tack, adhesion (to the substrate or to the tool), stability, slip resistance, adhesive pull and compressive strength or shrinkage.

In water-based paint and coating systems, too, polysaccharide derivatives, among other substances, are used in accordance with the prior art to prevent the sedimentation, for example, of the pigments. Microbial infestation also causes problems with the stability in storage of the mixes.

The prior art describes synthetic polymers having stabilising properties predominantly as additives in cooling muds and in bore hole cementation, where they are used to reduce the loss of water from laitances into the surrounding rock formation. DE 29 31 897 A1, DE 40 34 642 A1, DE 199 26 355 A1 and DE 197 52 093 C2 thus propose copolymers and terpolymers based on 2-acrylamido-2-methyl propane sulphonic acid as auxiliaries in the cementing of bore hole cementation. These polymers are optimised to the specific requirements of the application in the bore hole. When used in construction material mixes such as mortar and concrete or water-based paint and coating systems, they display drawbacks for the user, as either the flow properties are excessively restricted, the separation of bleed water is not prevented or the water retention capacity is insufficient.

Patent specification JP 10053627 describes terpolymers of N-vinylacetamide, 2-acrylamido-2-methyl propane sulphonic acid and acrylonitrile as stabilisers for highly flowable concrete. Although these terpolymers display a very good stabilising effect, they cannot prevent the separation of bleed water. The price/performance ratio is also much worse than that of cellulose ethers, as use is made with the N-vinylacetamide of a very expensive monomer, thus producing a major financial drawback for the user.

DE 198 06 482 A1 and WO 02/10229 A1 describe sulpho group-containing quaternary polymers of very high molecular weight which display very good water retention properties. In addition, they also have a very good stabilising effect in that they markedly increase the plastic viscosity of the mix.

This very marked thickening renders these polymers unsuitable for flowable construction material mixes or for water-based paint and coating systems, as the workability is restricted to a degree that is unacceptable to the user. The described polymers also contain a certain proportion of cationic monomers which are problematic in terms of fish toxicity.

In non-flowable construction material systems, the copolymers described in DE-OS 198 06 482 and WO 02/10229 display the drawback that they do not have the required tack, in particular in tile adhesives but also in plasters. The tile adhesive thus does not adhere properly to the filler and cannot be removed satisfactorily using the spreading comb.

In both applications, but in particular in plaster applications, the insufficient stability of the air voids is also problematic. The air, which is often introduced using air-pore formers, often bursts after approx. 10 to 20 minutes, probably as a result of the cationic structural units contained in the polymers.

Thickening in the presence of high salt concentrations is also necessary in tile adhesives, but also in plasters. In contrast to the polymers according to DE 198 06 482 A1, the sulpho group-containing, associatively thickening copolymers of high molecular weight according to WO 02/10 229 A1 do not display a marked drop in viscosity even in the presence of high salt concentrations.

The object of the present invention is to provide copolymers and the application thereof as water retention agents, stabilisers and rheology modifiers for aqueous construction material systems and water-based paint and coating systems, which copolymers do not have the aforementioned drawbacks of the prior art but rather improve the air void stability, which is unsatisfactory for application in non-flowable construction material systems, and the insufficient tack of the synthetic polymers, have an outstanding stabilising effect as the stabiliser for aqueous flowable construction material systems and water-based paint and coating systems, and at the same time do not markedly increase the viscosity of the system, so the workability is not adversely affected or the pump pressure is not significantly increased in the case of pumped construction material mixes.

In addition, the additives should also impart to the construction material and paint systems outstanding application-related properties during processing and in the hardened or dried state.

According to the invention, this object is achieved by the copolymers corresponding to claim 1.

That is to say, it has surprisingly been found that the copolymers according to the invention provide a substantial improvement in the air void stability in aqueous construction material systems based on hydraulic binders such as cement, lime, gypsum, anhydrite, etc. and in water-based paint and coating systems.

Depending on the composition of the copolymers, the rheology modification, water retention capacity and tack can also be optimally adjusted for each application; this was also unpredictable.

The water-soluble, sulpho group-containing copolymers corresponding to the present invention consist of at least three of the four structural groups a), b), c) and d), structural groups a) and b) being mandatory.

The first structural group is a sulpho group-containing substituted acrylic or methacrylic derivative of formula (I):

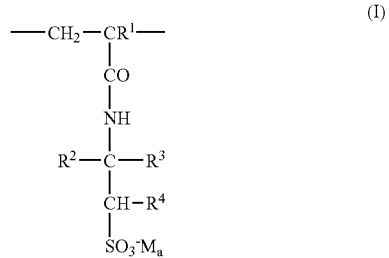

wherein
$R^1$=hydrogen or methyl,
$R^2$, $R^3$, $R^4$=hydrogen, an aliphatic hydrocarbon radical containing 1 to 6 carbon atoms, a phenyl radical optionally substituted by methyl groups and
M=hydrogen, a monovalent or divalent metal cation, an unsubstituted ammonium ion or an ion substituted by organic radicals and
a=½ or 1.

The monovalent or divalent metal cation used is preferably a sodium, potassium, calcium or magnesium ion. The ammonium ions substituted by organic radicals are preferably derived from primary, secondary or tertiary $C_1$ to $C_{20}$ alkylamines, $C_1$ to $C_{20}$ alkanolamines, $C_5$ to $C_8$ cycloalkylamines and $C_6$ to $C_{14}$ arylamines. Examples of corresponding amines include methylamine, dimethylamine, trimethylamine, ethanolamine, diethanolamine, triethanolamine, cyclohexylamine, dicyclohexylamine, phenylamine and diphenylamine in the protonated ammonium form.

Structural group a) is derived from monomers such as 2-acrylamido-2-methylpropane sulphonic acid, 2-methacrylamido-2-methylpropane sulphonic acid, 2-acrylamidobutane sulphonic acid, 3-acrylamido-3-methylbutane sulphonic acid, 2-acrylamido-2,4,4-trimethylpentane sulphonic acid. Particularly preferred is 2-acrylamido-2-methylpropane sulphonic acid.

The second structural group, structural group b), corresponds to formula (II):

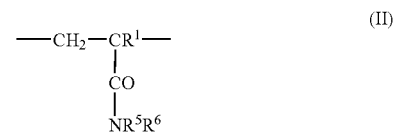

wherein
$R^1$ have the meaning given above,
$R^5$ and $R^6$ independently of each other, represent hydrogen, an aliphatic hydrocarbon radical containing 1 to 20 carbon atoms, a cyclcoaliphatic hydrocarbon radical containing 5 to 8 carbon atoms or an aryl radical containing 6 to 14 carbon atoms.

Monomers forming structure (II) preferably include the following compounds: acrylamide, methacrylamide, N-methylacrylamide, N,N-dimethylacrylamide, N-ethylacrylamide, N-cyclohexylacrylamide, N-benzylacrylamide, N-methylolacrylamide, N-tertiary butylacrylamide, etc.

The third structural group, structural group c), corresponds to formula (III)

wherein
$Y$=—$COO(C_nH_{2n}O)_p$—$R^7$, —$(CH_2)_q$—$O(C_nH_{2n}O)_p$—$R^7$
$R^7$=

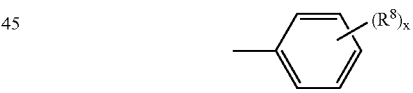

and an unsaturated or saturated, linear or branched aliphatic alkyl radical containing 10 to 40 carbon atoms
$R^8$=H, $C_1$ to $C_6$ alkyl, arylalkyl group containing a $C_1$ to $C_{12}$ alkyl and $C_6$ to $C_{14}$ aryl radical
n=2 to 4
p=0 to 200
q=0 to 20
x=0 to 3 and
$R^1$ has the meaning given above.

Preferred monomers forming structure (III) include tristyryl phenol-polyethylene glycol-1100-methacrylate, behenyl polyethylene glycol-1100-methacrylate, stearyl polyethylene glycol-1100-methacrylate, tristyryl phenol-polyethylene glycol-1100-acrylate, tristyryl phenol-polyethylene glycol-1100-monovinyl ether, behenyl polyethylene glycol-1100-monovinyl ether, stearyl polyethylene glycol-1100-monovinyl ether, tristyryl phenol-polyethylene glycol-1100-vinyloxy-butyl ether, behenyl polyethylene glycol- 1100-vinyloxy-butyl ether, tristyryl phenol-polyethylene glycol-block-propylene glycol allyl ether, behenyl polyethylene glycol-block-propylene glycol allyl ether, stearyl polyethylene glycol-block-propylene glycol allyl ether, etc.

The fourth structural group, structural group d), corresponds to formula (IV)

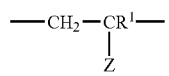
(IV)

wherein
$Z = -(CH_2)_q - O(C_nH_{2n}O)_p - R^9$
$R^9 = H$, $C_1$ to $C_4$ alkyl and
$R^1$, n, p and q have the meaning given as above.

Preferred monomers forming structure (IV) include allyl polyethylene glycol-(350 to 2000), methyl polyethylene glycol-(350 to 2000)-monovinyl ether, polyethylene glycol-(500 to 5000)-vinyloxy-butyl ether, polyethylene glycol-block-propylene glycol-(500 to 5000)-vinyloxy-butyl ether, methyl polyethylene glycol-block-propylene glycol allyl ether, etc.

It is to be regarded as instrumental to the invention that the copolymers consist of from 3 to 96 mol % of structural group a), 3 to 96 mol % of structural group b), 0.01 to 10 mol % of structural group c) and/or 0.1 to 30 mol % of structural group d). Preferably used copolymers contain from 30 to 80 mol % a), 5 to 50 mol % b), 0.1 to 5 mol % c) and/or 0.2 to 15 mol % d).

Furthermore, the copolymers of structural groups a), b) and c) are referred to as type A, copolymers of structural groups a), b), c) and d) as type B and copolymers of structural groups a), b) and d) as type C.

In the scope of the present invention, it is also possible for the type B and C copolymers according to the invention additionally to contain up to 50 mol %, in particular up to 20 mol %, based on the mol % totals of structural groups a), b), c) and d), of a further structural group e) of formula (V)

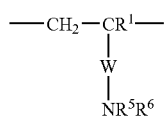
(V)

wherein
$W = -CO-O-(CH_2)_m-$, $-CO-NR^2-(CH_2)_m-$
m=1 to 6 and
$R^1$, $R^2$, $R^5$ and $R^6$ have the meaning given above.

Monomers forming structure (V) preferably include the following compounds: [3-(methacryloylamino)-propyl]-dimethylamine, [3-(acryloylamino)-propyl]-dimethylamine, [2-(methacryloyl-oxy)-ethyl]-dimethylamine, [2-(acryloyl-oxy)-ethyl]-dimethylamine, [2-(methacryloyl-oxy)-ethyl]-diethylamine, [2-(acryloyl-oxy)-ethyl]-diethylamine, etc.

In the scope of the present invention it is also possible for up to 50% of structural group a) to be replaced in the copolymers according to the invention by a sulphonic acid-containing betaine monomer of formula (VI)

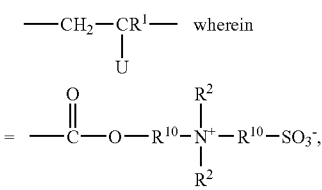

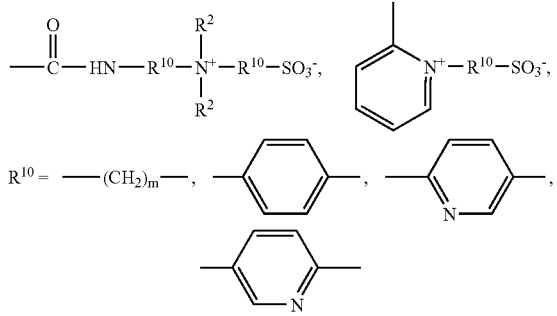

and
$R^1$, $R^2$ and m have the meaning given above.

Monomers forming structure (VI) preferably include the following compounds: N-(3-sulphopropyl)-N-methacryloxyethyl-N,N-dimethyl-ammonium-betaine, N-(3-sulphopropyl)-N-methacrylamidopropyl-N,N-dimethyl-ammonium-betaine and 1-(3-sulphopropyl)-2-vinyl-pyridinium-betaine. Although these monomers also contain a cationic structural group, this does not adversely affect the air void stability in the application.

The incorporation of small amounts of crosslinking agents can, if appropriate, provide the copolymers with a slightly branched or crosslinked structure. Examples of crosslinking agent components of this type include triallylamine, triallylmethylammonium chloride, tetraallylammonium chloride, N,N'-methylene-bis-acrylamide, triethylene glycol-bis-methacrylate, triethylene glycol-bis-acrylate, polyethylene glycol(400)-bis-methacrylate polyethylene glycol(400)-bis-acrylate. These compounds may be used only in amounts such that water-soluble copolymers are still obtained. In general, the concentration will rarely be above 0.1 mol %, based on the totals of structural groups a), b), c), d), e) and f), although a person skilled in the art can easily determine the maximum usable amount of crosslinking agent component.

The copolymers according to the invention are prepared, in a manner known per se, by linkage of the monomers forming structures a) to d) by radical, ionic or complex coordination substance, solution, gel, emulsion, dispersion or suspension polymerisation. As the products according to the invention are water-soluble copolymers, polymerisation in the aqueous phase, polymerisation in inverse emulsion or polymerisation in inverse suspension is preferred. In particularly preferred embodiments, the reaction is carried out as gel polymerisation in the aqueous phase.

With the preferred gel polymerisation, it is advantageous if the polymerisation is carried out at low reaction temperatures and using a suitable initiator system. The combination of two initiator systems (azo initiators and redox system), which are initially started photochemically at low temperatures and then, owing to the exothermia of the polymerisation, thermally, allows a reaction rate of $\geq 99\%$ to be achieved.

Other auxiliaries, such as molecular weight regulators, for example thioglycolic acid, mercapotoethanol, formic acid and sodium hypophosphite, can also be used.

The working-up of the gel block is facilitated using a release agent (for example, sitren 595 from Goldschmidt) which prevents the gel granules from caking. The free-flowing gel particles can thus be distributed more easily onto a drying grid. This facilitates the drying process and even allows drying times to be reduced.

The gel polymerisation is preferably carried out at −5 to 50° C., the concentration of the aqueous solution preferably being adjusted to 35 to 70% by weight. For carrying out the polymerisation in accordance with a preferred embodiment, the sulpho group-containing (meth)acrylic derivative, in the form of the conventional commercial acid form thereof, is dissolved in water, neutralised by addition of an alkali metal hydroxide, and mixed whilst stirring with further monomers to be used in accordance with the invention and with buffers, molecular weight regulators and other polymerisation auxiliaries. After adjustment of the polymerisation pH, which is preferably between 4 and 9, the mix is flushed with a protective gas such as helium or nitrogen and then heated or cooled to the corresponding polymerisation temperature. If unstirred gel polymerisation is selected as the embodiment, polymerisation is carried out in preferred layer thicknesses of from 2 to 20 cm, in particular 8 to 10 cm, under adiabatic reaction conditions. The polymerisation is started by the addition of the polymerisation initiator and by irradiation with UV light at low temperatures (between −5 and 10° C.). Once the reaction of the monomers is complete, the polymer is comminuted using a release agent (for example, Sitren 595 from Goldschmidt) to accelerate drying by increasing the surface area.

Using reaction and drying conditions that are as gentle as possible allows crosslinking secondary reactions to be avoided, thus providing polymers having a very low gel content.

The copolymers according to the invention preferably have a number average molecular weight $M_n$ of from 50,000 to 20,000,000 g/mol and are excellent additives for aqueous building material systems containing hydraulic binders such as cement, lime, gypsum, anhydrite, etc. They can also be used in water-based paint and coating systems.

Type A copolymers of structural units a), b) and c) surprisingly display very good air void stability. They also have very good water retention properties, salt-stable thickening properties and good tack (for example in a tile adhesive mortar). Type B copolymers of structural units a), b) c) and d) also display outstanding tack without sacrificing the remaining positive properties. Both copolymers according to the invention, type A and B copolymers, are ideal for use in non-flowable construction material systems such as, for example, tile adhesives, renders and joint fillers. They impart outstanding application-related properties to these construction materials, both in the processing and in the hardened or dried state.

Although type C copolymers of structural units a), b) and d) also have very good air void stability, the water retention properties, tack and thickening properties are markedly reduced compared to type A and B polymers. However, in highly flowable construction material systems, type C copolymers have outstanding stabilising properties, even when added in small amounts, and prevent the separation of bleed water at the surface. They impart to self-levelling screeds, grouting and repair mortars, flow screeds, flow concrete, self-compacting concrete, underwater concrete, underwater mortars, pigment-containing paints and the like outstanding application-related properties both in the processing and in the set or dried state. The addition of the copolymers does not substantially increase the viscosity (plastic viscosity) of the building material mix and the flow limit remains almost unaltered, so the workability of the flowable building material system is not restricted. The aqueous solutions of copolymers C also have very good stability in storage.

The type B and C copolymers according to the invention are also distinguished in that the contained structural unit d) lowers the glass transition temperature, and this is advantageous for the application in water-based paint and coating systems. This effect is further intensified if monomer elements of structural group e) are contained.

The copolymers according to the invention can also be used in combination with nonionic polysaccharide derivatives such as methylcellulose (MC), hydroxyethylcellulose (HEC), hydroxypropylcellulose (HPC), methylhydroxethylcellulose (MHEC), methylhydroxpropylcellulose (MHPC), methylhydroxypropylcellulose (MHPC) and welan gum or diutan gum.

The preferred amounts used of the copolymers according to the invention are, depending on the type of use, between 0.001 and 5% by weight, based on the dry weight of the construction material, paint or coating system.

The dried copolymers are supplied for their use according to the invention in powder form for dry mortar applications (for example, tile adhesives, grouting mortars, flow screeds). Adapting the grinding parameters allows the particle size distribution to be selected in such a way that the average particle diameter is less than 100 μm and the proportion of particles having a diameter of greater than 200 μm is less than 2% by weight. Preferred are particles having an average diameter of less 60 μm and wherein the proportion of particles having a diameter of greater than 120 μm is less than 2% by weight. Particularly preferred are powders having an average particle diameter of less than 50 μm and wherein the proportion of particles having a diameter of greater than 100 μm is less than 2% by weight.

In concrete, on the other hand, additives in general and stabilisers specifically are preferably used in the form of aqueous solutions. Particularly suitable for preparing the solutions are the relatively coarse granules of the copolymers according to the invention having an average particle diameter of between 300 μm and 800 μm, wherein the proportion of particles having a diameter of less than 100 μm is less than 2% by weight. The same applies if the copolymers according to the invention are dissolved in other concrete additives or formulations of concrete additives (for example, in a plasticizer)

The following examples will illustrate the invention in greater detail.

EXAMPLES

Copolymer 1

650 g of water were placed in a 1 l 3-necked flask with a stirrer and thermometer. 87 g of sodium hydroxide pellets were dissolved while stirring and 450 g (2.17 mol, 56.6 mol %) of 2-acrylamido-2-methyl propane sulphonic acid (I) were added slowly and stirred until a clear solution was obtained. After the addition of 0.50 g of citric acid hydrate, 5% by weight aqueous sodium hydroxide solution was added while stirring and cooling and a pH of 4.60 adjusted 164 g (1.64 mol, 42.8 mol %) of N,N-dimethylacrylamide (II) and 8.6 g (0.023 mol, 0.6 mol %) of tristyryl phenol-polyethylene glycol-1100-methycrylate (Sipomer SEM 25 from Rhodia; containing 25 ethylene glycol units) (III) were then added in succession, wherein the pH fell to 3. 300 ppm of formic acid were added as the molecular weight regulator. The solution was adjusted to pH=6.0 using 20% sodium hydroxide solution, rendered inert by flushing with nitrogen for 30 minutes and cooled to approx. 5° C. The solution was decanted into a plastics material container having the dimensions (w*d*h) 15 cm*10 cm*20 cm and 150 mg of 2,2'-azo-bis-(2-amidinopropane)-dihydrochloride, 1.0 g of 1% Rongalite C solution and 10 g of 0.1% tertiary butyl hydroperoxide solution were then added in succession. The polymerisation was started by irradiation with UV light (2 Philips tubes; Cleo Performance 40 W). After approx. 2-3 hours the hard gel was removed from the plastics material container and cut using a pair of scissors into gel cubes approx. 5 cm*5 cm*5 cm in size. The gel cubes were brushed with the release agent sitren 595 (polydimethylsiloxane emulsion; Goldschmidt) before being ground using a conventional mincer. The parting agent is a polydimethylsiloxane emulsion diluted with water to a ratio of 1:20.

The gel granules obtained were distributed uniformly over drying grids and dried in a circulating air drying cabinet at 90-120° C. under vacuum until a constant weight was achieved.

There were obtained approx. 650 g of white, hard granules which were transformed into a powdered state using a centrifugal mill. The average particle diameter of the polymer powder was 40 μm and the proportion of particles having a diameter of greater than 100 μm was less than 1% by weight.

Copolymer 2

In accordance with copolymer 1, copolymer 2 was prepared from 53 mol % of 2-acrylamido-2-methyl propane sulphonic acid (I), 46.7 mol % of acrylamide (II) and 0.3 mol % of tristyryl phenol-polyethylene glycol-1100-methacrylate (Sipomer SEM 25 from Rhodia) (III). 1,200 ppm of formic acid were added as the molecular weight regulator.

Copolymer 3

In accordance with copolymer 1, copolymer 3 was prepared from 54 mol % of 2-acrylamido-2-methyl propane sulphonic acid (I), 45.8 mol % of acrylamide (II) and 0.2 mol % of stearyl polyethylene glycol-1100-methacrylate (Plex 6877-O from Röhm) (III). 1,200 of formic acid were added as the molecular weight regulator.

Copolymer 4

In accordance with copolymer 1, copolymer 4 was prepared from 50.6 mol % of 2-acrylamido-2-methyl propane sulphonic acid (I), 47.6 mol % of acrylamide (II), 0.2 mol % of tristyryl phenol-polyethylene glycol-1100-methacrylate (Sipomer SEM 25 from Rhodia) (III) and 1.6 mol % of polyethylene glycol-block-propylene glycol-(1100)-vinyloxy-butyl ether (Emulsogen R 208 from Clariant) (IV). 1,000 ppm of formic acid were added as the molecular weight regulator.

Copolymer 5

In accordance with copolymer 1, copolymer 5 was prepared from 54.3 mol % of 2-acrylamido-2-methyl propane sulphonic acid (I), 44.3 mol % of acrylamide (II), 0.1 mol % of stearyl polyethylene glycol-1100-methacrylate (Plex 6877-O from Röhm) (III) and 1.3 mol % of polyethylene glycol-block-propylene glycol-(1100)-vinyloxy-butyl ether (Emulsogen R 208 from Clariant) (IV). 1,000 ppm of formic acid were added as the molecular weight regulator.

Copolymer 6

In accordance with copolymer 1, copolymer 6 was prepared from 52.6 mol % of 2-acrylamido-2-methyl propane sulphonic acid (I), 45.6 mol % of acrylamide (II), 0.2 mol % of tristyryl phenol-polyethylene glycol-1100-methacrylate (Sipomer SEM 25 from Rhodia) (III) and 1.1 mol % of polyethylene glycol-block-propylene glycol-(790)-vinyloxy-butyl ether (Emulsogen R 109 from Clariant) (IV) and 0.5 mol % of polyethylene glycol-block-propylene glycol-(3000)-vinyloxy-butyl ether (IV). 800 ppm of formic acid were added as the molecular weight regulator.

Copolymer 7

In accordance with copolymer 1, copolymer 7 was prepared from 58.4 mol % of 2-acrylamido-2-methyl propane sulphonic acid (I), 27.2 mol % of acrylamide (II), 0.3 mol % of tristyryl phenol-polyethylene glycol-(1100)-methacrylate (Sipomer SEM 25 from Rhodia) (III) and 1.7 mol % of polyethylene glycol-block-propylene glycol-(1100)-vinyloxy-butyl ether (Emulsogen R 109 from Clariant) (IV) and 12.4 mol % [3-(acryloylamino)-propyl]-dimethylamine (V). 800 ppm of formic acid were added as the molecular weight regulator.

Copolymer 8

In accordance with copolymer 1, copolymer 8 was prepared from 56.3 mol % of 2-acrylamido-2-methyl propane sulphonic acid (I), 42.3 mol % of acrylamide (II), 1.4 mol % of polyethylene glycol-(1100)-vinyloxy-butyl ether (IV). 300 ppm of formic acid were added as the molecular weight regulator.

Copolymer 9

In accordance with copolymer 1, copolymer 9 was prepared from 70.2 mol % of 2-acrylamido-2-methyl propane sulphonic acid (I), 27.4 mol % of N,N-dimethylacrylamide (II) of acrylamide (U) and 2.4 mol % of polyethylene glycol-block-propylene glycol-(790)-vinyloxy-butyl ether (Emulsogen R 109 from Clariant) (IV). 600 ppm of formic acid were added as the molecular weight regulator.

Copolymer 10

In accordance with copolymer 1, copolymer 10 was prepared from 46.6 mol % of 2-acrylamido-2-methyl propane sulphonic acid (I), 52.1 mol % of acrylamide (II), 1.3 mol % of polyethylene glycol-block-propylene glycol-(1100)-vinyloxy-butyl ether (Emulsogen R 208 from Clariant) (IV). 800 ppm of formic acid were added as the molecular weight regulator.

Copolymer 11

In accordance with copolymer 1, copolymer 11 was prepared from 60.3 mol % of 2-acrylamido-2-methyl propane sulphonic acid (I), 35.3 mol % of N,N-dimethylacrylamide (II), 3.5 mol % of polyethylene glycol-block-propylene glycol-(790)-vinyloxy-butyl ether (Emulsogen R 109 from Clariant) (TV) and 0.9 mol % of polyethylene glycol-block-propylene glycol-(3000)-vinyloxy-butyl (IV). 500 ppm of formic acid were added as the molecular weight regulator.

Copolymer 12

In accordance with copolymer 1, copolymer 12 was prepared from 47.5 mol % of 2-acrylamido-2-methyl propane sulphonic acid (I), 42.3 mol % of acrylamide (II), 1.5 mol % of polyethylene glycol-block-propylene glycol-(1100)-vinyloxy-butyl ether (Emulsogen R 208 from Clariant) (IV) and 8.7 mol % of [3-(acryloylamino)-propyl]-dimethylamine (V). 800 ppm of formic acid were added as the molecular weight regulator.

Comparative Example 1

In accordance with DE 198 06 482 A1, Comparative Example 1 was prepared from 68.8 mol % of 2-acrylamido-2-methyl propane sulphonic acid, 25.4 mol % of N,N-dimethylacrylamide, 5.4 mol % of [2-(methacryloyloxy)-ethyl]-trimethyl ammonium methosulphate and 0.4 mol % of allyl polyethylene glycol-550.

Comparative Example 2

In accordance with WO 02/10229 A1, Comparative Example 2 was prepared from 69.0 mol % of 2-acrylamido-2-methyl propane sulphonic acid, 26.4 mol % of N,N-dimethylacrylamide, 3.8 mol % of [2-(methacryloylamido)-propyl]-trimethyl ammonium chloride and 0.8 mol % of tristyryl phenol-polyethylene glycol-1100-methacrylate.

Table 1 lists the comminution properties and the necessary drying times. The residual moisture of the ground powder is a measure of the completeness of the drying process.

TABLE 1

|  | Gel properties | Drying Temperature [° C.] | Time [min] | Residual moisture [% by weight] |
| --- | --- | --- | --- | --- |
| Example 1 | very hard, small, easily free-flowing particles | 90 | 100 | 3 |
| Example 2 | as in Example 1 | 90 | 100 | 6 |
| Example 3 | as in Example 1 | 90 | 100 | 5 |
| Example 4 | hard, small, easily free-flowing particles | 100 | 90 | 6 |
| Example 5 | as in Example 4 | 100 | 90 | 3 |
| Example 6 | as in Example 4 | 100 | 90 | 7 |
| Example 7 | as in Example 4 | 100 | 100 | 5 |
| Example 8 | hard particles, much larger than in Example 1 | 100 | 110 | 4 |
| Example 9 | as in Example 8 | 100 | 110 | 5 |
| Example 10 | as in Example 8 | 100 | 110 | 6 |
| Example 11 | as in Example 8 | 100 | 110 | 5 |
| Example 12 | as in Example 8 | 100 | 100 | 4 |
| Comparative Example 1 | soft gel; difficult to comminute; the gel particles cake again to form lumps | 100 | 120 | 6 |
| Comparative Example 2 | very hard, small, easily free-flowing particles | 90 | 100 | 3 |

Table 2 lists the solution viscosities of aqueous solutions.

TABLE 2

| | Viscosity 1% solution [mPa * s][1] | Viscosity 1% solution containing 1% sodium sulphate [mPa * s][1] |
| --- | --- | --- |
| Example 1 | 9,160 | 8,210 |
| Example 2 | 12,620 | 11,710 |
| Example 3 | 13,480 | 6,930 |
| Example 4 | 6,200 | 3,230 |
| Example 5 | 7,260 | 3,150 |
| Example 6 | 7,340 | 2,130 |
| Example 7 | 7,750 | 6,160 |
| Example 8 | 8,830 | 850 |
| Example 9 | 6,210 | 620 |
| Example 10 | 5,130 | 320 |
| Example 11 | 5,420 | 340 |
| Example 12 | 3,630 | 310 |
| Comparative Example 1 | 6,200 | 260 |
| Comparative Example 2 | 7,150 | 2,630 |

[1] 20° C., Brookfield, $H_2O$ (at a speed of 5 rpm)

As may be clearly be seen the viscosities of the polymer solutions are much higher than in Comparative Example 1 when electrolytes are added, although the viscosities without the addition of salt are at a similar level. As in Comparative Example 2, the viscosities of Examples 1 to 3 and 4 to 7 fall markedly under the influence of the electrolytes. The drop in viscosity is much more marked in Examples 8 to 12, but not as marked as in Comparative Example 1.

Examples of Application

The application-related evaluation of the copolymers according to the invention was based on test mixes from the field of tile adhesive mortars, machine-applied plaster, self-levelling gap-levelling materials, grouting mortars and self-compacting concrete.

1) Tile Adhesive Mortar:

Practical tests were carried out using a ready-to-use dry mix to which the copolymers according to the invention or the comparative products were added in solid form. Following dry mixing, a specific amount of water was added and stirred intensively using a power drill with G3 mixer (for 2*15 seconds). The stirred mix was then left to mature for 5 min before being subjected to a first visual inspection.

Determining the Slump

The slump was determined firstly after the maturation time and secondly 30 min after stirring (after brief manual stirring) in accordance with DIN 18555, Part 2.

Determining the Water Retention

The water retention was calculated approx. 15 min after stirring in accordance with DIN 18555, Part 7.

Determining the Air Void Stability

The air void stability was determined qualitatively by visual assessment.

Determining the Tack

The tack was determined qualitatively by visual assessment.

Determining the Wetting of the Tiles

The tile adhesive formulation was applied to a fibre cement plate onto which there was placed after 10 minutes a tile (5×5 cm) which was loaded with a weight of 2 kg for 30 seconds. After a further 60 minutes this tile was removed and it was calculated what percentage of the back of the tile was still covered with adhesive.

Table 3 sets out the composition of the tile adhesive mortar.

TABLE 3

Composition of the test mix (in % by weight)

| Component | Amount |
|---|---|
| Portland cement[1] | 36.00 |
| Silica sand (0.5-0.4 mm) | 56.90 |
| White pigment[2] | 5.50 |
| Cellulose fibres | 0.50 |
| Water retention agent | 0.16 |

[1]CEM II 42.5 R
[2]Ulmer Weiβ "Juraperle MHS"

The test results obtained with the copolymers according to the invention and the polymers of the comparative Examples are set out in Table 4.

The test results in Table 4 show that the type A copolymers according to the invention Examples 1-3) produce similar water retention values and tack to Comparative Examples 1 and 2. However, the slump, wetting and air void stability are much better than in Comparative Examples 1 and 2 which contain cationic monomers.

The type B copolymers according to the invention (Examples 4-7) display the same positive properties and also outstanding tack. The best type B properties are displayed by Example 6 which contains two polyethylene glycol-block-propylene glycol-vinyloxy-butyl ethers of differing chain length.

The test results obtained with Examples 9 and 12, on the other hand, reveal that the type C copolymers according to the invention are unsuitable for this application. The water retention values, tack, slump, wetting and air void stability decrease compared to the type A and B copolymers.

2) Machine-Applied Plaster:

Practical tests were carried out using a ready-to-use dry mix to which the copolymers according to the invention or the comparative products were added in solid form. Following dry mixing, a specific amount of water was added and stirred intensively using a power drill with G3 mixer (for 2*15 seconds). The stirred mix was then left to mature for 2 min and was subjected to a first visual inspection.

Determining the Slump

The slump was determined after the maturation time in accordance with DIN 18555, Part 2.

Determining the Water Retention

The water retention was calculated after the maturation time in accordance with DIN 18555, Part 7.

Determining the Air Void Content

The air void content was calculated after the maturation time in accordance with DIN 18555, Part 7.

Determining the Air Void Stability

The air void stability was determined qualitatively by visual assessment.

TABLE 4

Processing properties of an adhesive mortar for ceramic tiles, which has been modified with blends according to the invention and Comparative Examples corresponding to the prior art.

| Additive | Slump (cm) | Slump after 30 min (cm) | Water retention (%) | Tack | Wetting (%) | Air void stability |
|---|---|---|---|---|---|---|
| Example 1 | 14.1 | 14.8 | 98.7 | good | 77 | very good |
| Example 2 | 14.2 | 14.6 | 99.1 | good | 81 | very good |
| Example 3 | 14.1 | 14.5 | 98.6 | good | 75 | very good |
| Example 4 | 14.2 | 14.3 | 98.8 | very good | 82 | very good |
| Example 5 | 14.6 | 14.8 | 98.9 | very good | 78 | very good |
| Example 6 | 14.1 | 14.3 | 99.2 | very good | 83 | very good |
| Example 7 | 14.8 | 14.9 | 98.7 | very good | 88 | very good |
| Example 9 | 16.9 | 17.0 | 96.5 | moderate | 65 | good |
| Example 12 | 16.5 | 16.9 | 97.2 | moderate | 68 | good |
| Comparative Example 1 | 14.9 | 14.8 | 98.8 | moderate | 60 | moderate |
| Comparative Example 2 | 15.0 | 15.5 | 98.5 | good | 65 | good |

Amount added: 0.16% by weight
Amount of water: 260 g
Adhesive mortar: 1,000 g

Evaluating the Setting Behaviour

The hardness was assessed visually after 24 hours (qualitative assessment).

Table 5 sets out the composition of the machine-applied plaster.

TABLE 5

Composition of the test mix (in % by weight)

| Component | Amount |
|---|---|
| Lime hydrate | 10.00 |
| Limestone sand (0.1-1 mm) | 50.68 |
| Plaster of Paris | 39.00 |
| Air-pore formers[1] | 0.02 |
| Retarder[2] | 0.10 |
| Water retention agent | 0.20 |

[1]Hostapon OSB
[2]Tartaric acid

TABLE 6

Processing and setting properties of a lime/gypsum-based machine-applied plaster which has been modified using the copolymers according to the invention or the Comparative Examples.

| Additive | Slump (cm) | Air voids (% by volume) | Air void stability after 20 min | Water retention (%) | Hardness after 24 hour (visual) |
|---|---|---|---|---|---|
| Example 2 | 14.2 | 17.5 | very good | 98.7 | hard |
| Example 3 | 14.7 | 18.7 | very good | 98.9 | hard |
| Example 4 | 14.0 | 21.0 | very good | 99.2 | hard |
| Example 6 | 13.7 | 22.1 | very good | 99.1 | hard |
| Example 7 | 13.9 | 21.3 | very good | 98.9 | hard |
| Example 9 | 15.5 | 16.5 | good | 95.2 | hard |
| Example 12 | 15.2 | 18.4 | good | 96.0 | hard |
| Comparative Example 1 | 15.0 | 17.0 | moderate | 98.9 | hard |
| Comparative Example 2 | 14.3 | 18.2 | moderate | 98.9 | hard |

Amount added: 0.20% by weight
Dry mortar: 2,000 g
Water: 700 g

The test results in Table 6 show that the type A copolymers according to the invention (Examples 2-3) and B (Examples 4, 6 and 7) produce outstanding water retention values (similar to those of Comparative Examples 1 and 2). However, the slump, in particular of the type B copolymers is better than in Comparative Examples 1 and 2. It is also notable that the stability of the air voids introduced using the copolymers according to the invention is much better than in comparative Examples 1 and 2 which contain cationic monomers.

The test results obtained using Examples 9 and 12, on the other hand, reveal that the type C copolymers according to the invention are unsuitable for this application. The water retention values, slump and air void content fall compared to the type A and B copolymers.

3) Self-Levelling Cementitic Levelling Material:

In self-levelling cementitic levelling materials, use is made in accordance with the prior art of casein which acts in this case as a flow promoter but also, to some extent as a stabiliser. Small amounts of cellulose ether are sufficient to achieve stabilisation (prevention of segregation and bleeding) of the mix. However, levelling materials of this type, also referred to as self-levelling underlayments (SLUs), can also be plasticized using polycarboxylate ether plasticizers. This also requires the addition of a stabiliser.

The self-levelling cementitic levelling material was mixed in a laboratory using a mortar mixer to DIN EN 196-1. The mixing process was carried out in accordance with EN 1937. The overall mixing time was 7 min and 55 sec.

The flow dimensions (=diameter of the spread cake in cm) were determined in accordance with EN 12706 (November 1999 version) using the prescribed ring (internal diameter=30 mm, height=50 mm) on a planar, dry pane of glass. The flow dimensions were determined 3 times per mix at times t=8, 30, 45 min (before the flow dimensions were determined, the mix was stirred up again using a spoon for 60 seconds in each case).

Determining the Self-Healing

The self-healing properties of the applied levelling materials were examined using what is known as the knife-cut test. A spread cake was therefore firstly produced at time t=8 min on a planar plastics material sheet, the ring prescribed in accordance with EN 12706 again being used for this purpose. This circular spread cake, which had been left to mature, was cut using a conventional kitchen knife, so the blade was in contact with the plastics material sheet at the base of the spread cake throughout the entire cut (for approx 2 sec). The knife cuts were then carried out at four times t=8, 15, 30 and 45 min after the start of mixing.

The spread cake was then stored for 24 hours under standard atmospheric conditions (plus 20° C., 65% relative humidity) until it had cured. The positions at which the knife cuts had been made on the previous day were then assessed visually and optionally by probing them manually so as to establish how effectively the incisions formed by the knife cuts in the spread cake had healed again (i.e. reconverged).

The following seven-stage evaluation scale was used to assess the self-healing properties:

Grade 1: cut has disappeared completely, invisible

Grade 2: cut is disappearing, but is still visible

Grade 3: cut is disappearing, but edge visible

Grade 4: cut is disappearing, but edge clearly visible

Grade 5: cut not disappearing properly, incision remains

Grade 6: cut not disappearing properly, deep incision remains

Grade 7: cut not disappearing, incision remains down to the base of the layer

Table 2 sets out the composition of the self-levelling cementitic levelling material.

TABLE 7

Composition of the test mix (in % by weight)

| Component | Amount |
|---|---|
| Portland cement[1] | 18.50 |
| Aluminous cement (approx 40% $Al_2O_3$) | 11.50 |
| Silica sand (0.05-0.315 mm) | 40.54 |
| Limestone powder (calcium carbonate, 10-20 μm) | 19.40 |
| Calcium sulphate (anhydrous, synthetic anhydrite) | 6.50 |
| Redispersible powder[2] | 2.00 |
| Shrinkage reducing agent[3] | 0.60 |
| Melflux 2651[4] | 0.40 |
| Retarder[5] | 0.30 |
| Accelerator[6] | 0.10 |
| Defoaming agent[7] | 0.15 |
| Stabiliser[8] | 0.01 |

[1]CEM I 42.5 R
[2]VINNAPAS RE 523 Z product from Wacker, Burghausen
[3]Neopentyl glycol, product from Syskem Chemiehandel GmbH, Wuppertal
[4]Product from Degussa Construction Polymers GmbH, Trostberg
[5]Citric acid
[6]Lithium carbonate
[7]Agitan P 800, product from Musing Chemie, Heilbronn
[8]Copolymer according to the invention or comparative example the self-healing properties are very markedly restricted, in particular over time, and this is highly disadvantageous to the user. Although halving the amount added of these polymers provides very good flow behaviour of the self-levelling cementitic levelling material, marked bleeding and segregation occur, and this is also very disadvantageous to the user.

4) Grouting Mortar

The cement mortar was mixed in a laboratory using a mortar mixer to DIN EN 196-1. The mixing process was also carried out as described in DIN EN 196-1. The mixing time was 4 min. The flow dimensions (=diameter of the spread cake in cm) were determined using a Vicat-ring described in DIN EN 196, Part 3 (internal diameter at the top=70 mm, internal diameter at the bottom=80 mm, height=40 mm) on a planar, dry pane of glass. The flow dimensions were determined three times per mix at times t=5, 30, 60 min (before the flow dimensions were determined, the mix was stirred up again using a spoon for 60 seconds in each case).

Table 9 sets out the composition of the grouting mortar.

TABLE 9

Composition of the test mix (in % by weight)

| Component | Amount |
|---|---|
| Portland cement[1] | 30.75 |
| Standard sand (0-2 mm)[2] | 65.33 |
| EFA filler[3] | 2.31 |

TABLE 8

Comparison of the properties of the self-levelling cementitic levelling material with the copolymers according to the invention and the comparative examples (dried mortar mix: 1,000 g; amount of water: 200 g)

| Additive | Bleeding | Segregation | Slump after 8 min [cm] | Slump after 30 min [cm] | Slump after 30 min [cm] | Self-healing after 8 min | Self-healing after 15 min | Self-healing after 30 min | Self-healing after 45 min |
|---|---|---|---|---|---|---|---|---|---|
| Example 1 | none | none | 12.0 | 11.5 | 8.7 | 3 | 4 | 6 | 6 |
| Example 1[1] | marked | marked | 15.7 | 15.4 | 12.9 | 2 | 2 | 3 | 5 |
| Example 6 | none | none | 12.3 | 11.6 | 8.5 | 3 | 3 | 5 | 6 |
| Example 6[1] | marked | marked | 16.0 | 15.7 | 13.1 | 1 | 1 | 3 | 4 |
| Example 8 | none | none | 15.4 | 15.0 | 14.6 | 1 | 1 | 2 | 2 |
| Example 9 | none | none | 15.3 | 15.0 | 14.5 | 1 | 1 | 1 | 2 |
| Example 10 | none | none | 15.4 | 15.1 | 14.6 | 1 | 1 | 1 | 2 |
| Example 12 | none | none | 15.2 | 14.8 | 14.1 | 1 | 1 | 2 | 3 |
| Comparative Example 1 | none | none | 11.0 | 10.3 | 9.2 | 3 | 4 | 6 | 6 |
| Comparative Example 1[1] | marked | marked | 15.8 | 15.3 | 12.8 | 2 | 2 | 3 | 4 |
| Comparative Example 2 | none | none | 12.2 | 11.2 | 8.8 | 3 | 3 | 5 | 6 |
| Comparative Example 2[1] | marked | marked | 15.9 | 15.6 | 13.2 | 1 | 1 | 2 | 4 |

[1]Amount added 0.005% by weight

As the test results in Table 8 show, the type C copolymers according to the invention (Examples 8 to 10 and 12) ensure very good flow dimensions over time and effectively prevent bleeding and segregation. In addition, the self-healing capacity is very good after 15 and 30 minutes and is still good after as long as 45 minutes. In the self-levelling cement gap-filling material, liquefied with a polycarboxylate ether flow promoter (Melflux 2651 F), the type C copolymers according to the invention act as outstanding stabilisers and ensure optimum workability of the building material mix for the user.

The type C copolymers according to the invention also delay neither cement hydration nor curing. There is also no discernible detrimental effect on the development of strength.

With the type A (Example 1) and B (Example 6) copolymers, too, as in comparative Examples 1 and 2, no bleeding and no segregation occurs, although the flow behaviour and TABLE 9-continued Composition of the test mix (in % by weight)

| Component | Amount |
|---|---|
| CSA 20[4] | 1.37 |
| Cement/Al powder (995/5)[5] | 0.08 |
| Melflux 1641 F[6] | 0.15 |
| Stabiliser[7] | 0.01 |

[1]CEM I 52.5 R
[2]To DIN EN 196-1
[3]Product from Bau Mineral, Herten
[4]Calcium sulphoaluminate, product from Denka, Japan
[5]Mix of 995 parts by weight of CEM I 52.5 R and 5 parts by weight of Al powder (Standard SK I, product from Eckhart, Furth)
[6]Product from Degussa Construction Polymers GmbH, Trostberg
[7]Copolymer according to the invention or comparative example

TABLE 10

Comparison of the mortar properties with the copolymers according to the
invention and comparative examples
Grouting mortar dry mix: 1,000 g
Amount of water: 100 g

| Additive | Bleeding | Segregation | Flow dimensions after 5 min [cm] | Flow dimensions after 30 min [cm] | Flow dimensions after 60 min [cm] |
| --- | --- | --- | --- | --- | --- |
| Example 2 | none | none | 21.1 | 18.2 | 11.0 |
| Example 2[1] | marked | marked | 29.1 | 28.2 | 25.0 |
| Example 4 | none | none | 20.2 | 17.3 | 10.2 |
| Example 4[1] | marked | marked | 28.2 | 27.3 | 25.7 |
| Example 8 | none | none | 29.2 | 28.7 | 26.7 |
| Example 9 | none | none | 29.5 | 29.0 | 27.3 |
| Example 10 | none | none | 29.0 | 28.1 | 26.5 |
| Example 11 | none | none | 29.4 | 29.0 | 28.1 |
| Example 12 | none | none | 28.9 | 28.8 | 27.6 |
| Comparative Example 1 | none | none | 22.1 | 17.8 | 14.3 |
| Comparative Example 1[1] | marked | marked | 29.1 | 27.4 | 26.4 |
| Comparative Example 2 | none | none | 19.8 | 16.3 | 10.2 |
| Comparative Example 2[1] | marked | marked | 28.3 | 26.3 | 25.6 |
| Comparison with cellulose ether[2] | none | none | 27.3 | 25.4 | 23.2 |

[1] Amount added 0.005% by weight
[2] Amount added 0.04% by weight of Tylose H 20 P 2; product from Clariant GmbH, Frankfurt The test results in Table 10 show that the type C copolymers according to the invention (Examples 8 to 12) ensure very good flow dimensions, even over time, and effective prevention of bleeding and segregation. This shows that the type C copolymers according to the invention are excellent stabilisers for cooperating with the polycarboxylate ether flow promoter (Melflux 1641 F; Degussa Construction Polymers GmbH) to ensure for the user optimum workability of the grouting mortar. With the type C copolymers according to the invention (Examples 8 to 12), the workability is even better than with a conventional commercial stabiliser (comparison with cellulose ether), as higher flow dimensions are obtained over time without the occurrence of bleeding and segregation.

No bleeding or segregation occurs with the type A (Example 2) and B (Example 4) copolymers or in Comparative Examples 1 and 2 either, although the flow behaviour is very markedly restricted, and this is highly disadvantageous for the user. Although halving the amount added of these polymers provides very good flow behaviour of the grouting mortar, marked bleeding and segregation occur, and this is also very disadvantageous for the user.

5) Self-Compacting Concrete:

The self-compacting concretes were mixed in a laboratory using a 50-liter forced mixer. The efficiency of the mixer was 45%. During the mixing process, additives and powder-fine substances were homogenised in the mixer for 10 seconds before the mixing water, the flow promoter and the stabiliser (as an aqueous solution or as a powder) were then added. The mixing time was 4 minutes. The fresh concrete test (setting flow dimension) was then carried out and evaluated. The consistency profile was observed over 120 mins.

Determining the Setting Flow Dimensions

What is known as an Abrams-cone (internal diameter at the top 100 mm, internal diameter at the bottom 200 mm, height 300 mm) was used for determining the flowability (setting flow dimension=diameter of the concrete cake in cm measured and averaged over two axes perpendicular to each other). The setting flow dimension was determined four times per mix at times t=0, 30, 60 and 90 minutes after completion of mixing, wherein the mix was mixed through again for 30 seconds using the concrete mixer before each flow dimension was determined.

Assessment of Bleeding and Segregation

Bleeding and segregation of the mixes were evaluated visually.

Table 11 sets out the composition of the self-compacting concrete.

TABLE 11

Composition of the test mix in kg/m$^3$; water content 160 kg/m$^3$

| Component | Amount |
| --- | --- |
| Portland cement[1] | 290 |
| Sand (0-2 mm) | 814 |
| Gravel (2-8 mm) | 343 |
| Gravel (8-16 mm) | 517 |
| Fly ash | 215 |
| Melflux 2453 L[2] | 3.3 |
| Stabiliser[3] | 53.9 |

[1] CEM I 42.5 R
[2] Product from Degussa Construction Polymers GmbH, Trostberg
[3] Copolymer according to the invention or Comparative Example. The mix was added as a 1 M % aqueous solution (the water content of the stabiliser is subtracted from the total amount of the mixing water).

TABLE 12

Comparison of the properties of the self-compacting concrete with the copolymers according to the invention and the Comparative Examples.

| Additive | Bleeding | Segregation | Setting flow dimension after 0 min | Setting flow dimension after 30 min | Setting flow dimension after 60 min | Setting flow dimension after 90 min | Compressive strength after 1 day | Compressive strength after 7 days | Compressive strength after 28 days |
|---|---|---|---|---|---|---|---|---|---|
| without stabiliser (comparison) | marked | marked | 77 | 75 | 74 | 71 | 2.1 N/mm$^2$ | 35.6 N/mm$^2$ | 55.7 N/mm$^2$ |
| Example 1 | none | none | 61 cm | 58 cm | 55 cm | 52 cm | 13 N/mm$^2$ | 40 N/mm$^2$ | 57 N/mm$^2$ |
| Example 4 | none | none | 63 cm | 60 cm | 57 cm | 55 cm | 14 N/mm$^2$ | 41 N/mm$^2$ | 58 N/mm$^2$ |
| Example 10 | none | none | 74 cm | 72 cm | 72 cm | 71 cm | 16 N/mm$^2$ | 46 N/mm$^2$ | 64 N/mm$^2$ |
| Example 12 | none | none | 73 cm | 72 cm | 71 cm | 70 cm | 15 N/mm$^2$ | 47 N/mm$^2$ | 62 N/mm$^2$ |
| Comparative Example 1 | moderate | moderate | 74 cm | 71 cm | 70 cm | 69 cm | 12 N/mm$^2$ | 41 N/mm$^2$ | 57 N/mm$^2$ |

As may be seen from the test results in Table 12, the type C copolymers according to the invention (Examples 10 and 12) ensure very good setting flow dimensions, even over time, and effective prevention of bleeding and segregation. This shows that the type C copolymers according to the invention are excellent stabilisers even in self-compacting concrete and ensure for the user optimum workability of the fresh concrete. There is also no discernible detrimental effect on the development of strength.

Although the type A (Example 1) and type B (Example 4) copolymers according to the invention also very effectively prevent the occurrence of bleeding and segregation, the flowability of the concrete is excessively restricted, and this has a detrimental effect on workability.

If, on the other hand, the Comparative Example is used, average bleeding and segregation occur, and this has a detrimental effect on the homogeneity of the fresh concrete and thus also on the strengths of the concrete.

The invention claimed is:

1. A water-soluble, sulpho group-containing copolymer consisting essentially of at least one of
a) from 3 to 96 mol % of formula (I)

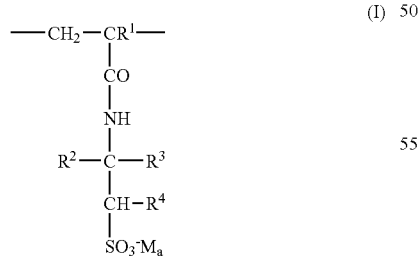

wherein
$R^1$ is hydrogen or methyl,
$R^2$, $R^3$, $R^4$ are independently selected from hydrogen, an aliphatic hydrocarbon radical containing 1 to 6 carbon atoms, or a phenyl radical optionally substituted by methyl group; and M is hydrogen, a monovalent or divalent metal cation, an unsubstituted ammonium ion or an ammonium ion substituted by organic radicals; and
a is ½ or 1;
and
b) from 3 to 96 mol % of formula (II)

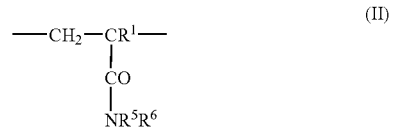

wherein
$R^1$ has the meaning given above,
$R^5$ and $R^6$ are independently selected from hydrogen, an aliphatic hydrocarbon radical containing 1 to 20 carbon atoms, a cycloaliphatic hydrocarbon radical containing 5 to 8 carbon atoms or an aryl carbon radical containing 6 to 14 carbon atoms,
and
c) from 0.01 to 10 mol % of the structural groups of formula (III)

wherein
Y is —COO($C_nH_{2n}O)_p$—$R^7$, —$(CH_2)_q$—O($C_nH_{2n}O)_p$—$R^7$;
$R^7$ is

or an unsaturated or saturated, linear or branched aliphatic alkyl radical containing 10 to 40 carbon atoms,
$R^8$ is H, $C_1$ to $C_6$ alkyl, arylalkyl group containing a $C_1$ to $C_{12}$ alkyl and $C_6$ to $C_{14}$ aryl radical,
n is from 2 to 4,
p is from 0 to 200, q is from 0 to 20,
x is from 0 to 3 and
$R^1$ has the meaning given above,
or
d) from 0.1 to 30 mol % of the structural groups of formula (IV)

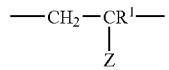  (IV)

wherein
Z is $-(CH_2)_q-O(C_nH_{2n}O)_p-R^9$,
$R^9$ is H or a $C_1$ to $C_4$ alkyl; and
$R^1$, n, p and q have the meaning given above.

2. A copolymer according to claim 1, wherein the monovalent or divalent metal cation consists of sodium, potassium, calcium or magnesium ions.

3. A copolymer according to claim 1, wherein the ammonium ions substituted by organic radicals are preferably derived from primary, secondary and tertiary $C_1$ to $C_{20}$ alkylamines, $C_1$ to $C_{20}$ alkanolamines, $C_5$ to $C_8$ cycloalkylamines and $C_6$ to $C_{14}$ arylamines.

4. A copolymer according to claim 1, wherein they consist of from 30 to 80 mol % of structural group a), 5 to 50 mol % of structural group b), 0.1 to 5 mol % of structural group c) and/or 0.2 to 15 mol % of structural group d).

5. A copolymer according to claim 1, wherein they have a number average molecular weight of from 50,000 to 20,000,000 g/mol.

6. A copolymer according to claim 1, wherein the compounds consisting of structural groups a), b), c) and d) or a), b) and d) additionally contain up to 50 mol %, in particular up to 20 mol %, based on the mol % totals of structural groups a), b), c) and d), of a further structural group e) based on formula (V)

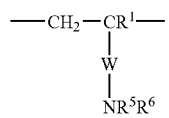  (V)

wherein
W is $-COO(CH_2)_m-$, $-CO-NR^2(CH_2)_m-$
m is from 1 to 6 and
$R^1$, $R^2$, $R^5$ and $R^6$ have the meaning given above.

7. A copolymer according to claim 1, wherein up to 50% of structural group a) is replaced by structural unit f) according to formula (VI) derived from sulphonic acid-containing betaine monomers

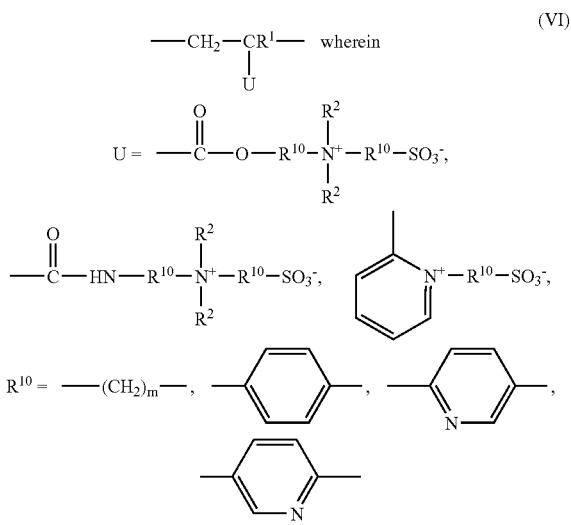

and
$R^1$, $R^2$ and m have the meaning given above.

8. A copolymer according to claim 1, wherein they additionally contain up to 0.1 mol %, based on the totals of structural groups a), b), c), d), e) and f), of a crosslinking agent component selected from the group consisting of triallylamine, triallylmethylammonium chloride, tetraallylammonium chloride, N,N'-methylene-bis-acrylamide, triethylene glycol-bis-methacrylate, triethylene glycol-bis-acrylate, polyethylene glycol(400)-bis-methacrylate and polyethylene glycol(400)-bis-acrylate.

9. A method for the production of the copolymer according to claim 1, wherein monomers forming structures a) to d) and optionally e) and f) are reacted by radical, ionic or complex coordination substance, solution, gel, emulsion, dispersion or suspension polymerization.

10. A method according to claim 9, wherein the copolymer is produced by gel polymerization in aqueous phase in presence of initiators arid optionally other auxiliaries such as, for example, molecular weight regulators.

11. A method according to claim 10, wherein the gel polymerization is carried out at −5 to 50° C. and a concentration of the aqueous solution of from 35 to 70% by weight.

12. An aqueous construction material systems comprising hydraulic binders selected from cement, lime, gypsum or anhydrite and in water-based paint and coating system comprising the copolymer of claim 1.

13. The aqueous construction material system according to claim 12, wherein the copolymer is a water retention agent, a stabilizer or a rheology modifier.

14. The aqueous construction material according to claim 12, wherein the copolymer is present in an amount of from 0.001 to 5% by weight, based on the dry weight of the construction material, paint or coating system.

* * * * *